United States Patent [19]

Kamperman

[11] Patent Number: 4,647,118
[45] Date of Patent: Mar. 3, 1987

[54] STORAGE CONTAINER

[76] Inventor: Charles F. Kamperman, 200 N. Shenandoah Dr., Apt. 201, Latrobe, Pa. 15650

[21] Appl. No.: 745,025

[22] Filed: Jun. 13, 1985

[51] Int. Cl.[4] ............................................. G11B 33/02
[52] U.S. Cl. ................................... 312/13; 312/276; 312/12; 206/387
[58] Field of Search ................ 312/12, 13, 274, 275, 312/276, 23, 24, 25, 297, 307, 315, 15; 206/387

[56] References Cited

U.S. PATENT DOCUMENTS

| 1,015,844 | 1/1912 | Scholl | 312/12 |
|---|---|---|---|
| 1,235,362 | 7/1917 | Nelles | 312/12 |
| 1,371,766 | 3/1921 | Johnson | 312/12 |
| 3,007,758 | 11/1961 | Goldberg | 312/274 |
| 3,009,753 | 11/1961 | Gittins | 312/274 |
| 4,162,112 | 7/1979 | Konkler | 312/15 |
| 4,270,817 | 6/1981 | McRae | 312/15 |
| 4,275,943 | 6/1981 | Gelardi et al. | 312/12 |
| 4,339,162 | 7/1982 | Gelardi et al. | 312/12 |

FOREIGN PATENT DOCUMENTS 0134281 3/1985 European Pat. Off. ............ 206/387
2837609 3/1980 Fed. Rep. of Germany .

Primary Examiner—Kenneth J. Dorner
Assistant Examiner—Gerald A. Anderson
Attorney, Agent, or Firm—Webb, Burden, Robinson & Webb

[57] ABSTRACT

A storage container having a housing with an open front and a door for closing the open front of the housing. The housing has spaced parallel sidewalls, a top wall, a rear wall and a bottom wall, and a movable slide is located within the housing above the bottom wall. The door is pivotally connected to the bottom wall and the slide is pivotally connected to the door. The pivotal connection between the slide and the door is located above the pivotal connection between the door and the bottom wall when the door is closed. Legs are located on the lower surface of the slide so that when the door is rotated into the open position, the slide is moved forwardly by the pivotal connection between the slide and the door and the slide is tilted upwardly about the lower end of the legs to permit items resting on the slide to move forwardly onto the door into contact with an indexing stop member which is located on the door.

20 Claims, 8 Drawing Figures

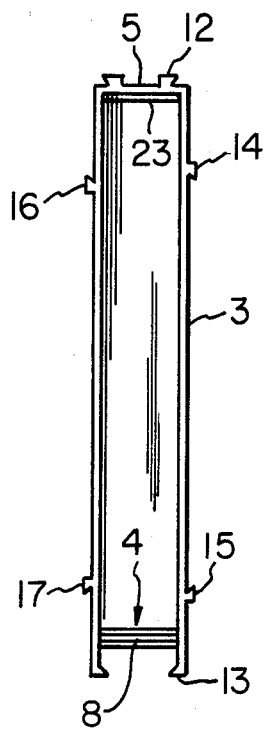
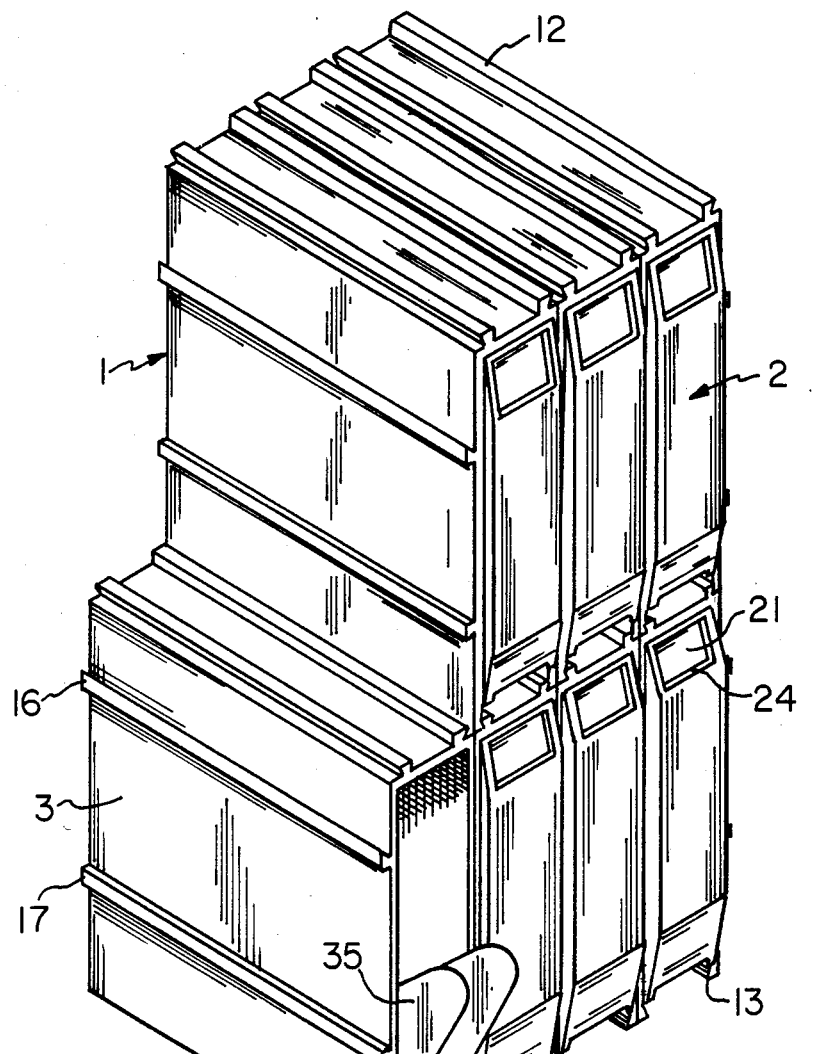
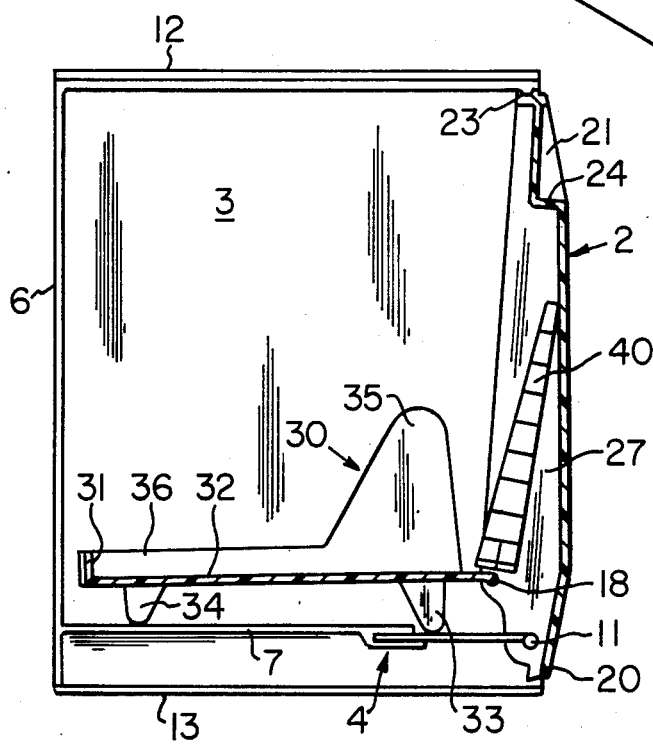
Fig.1
Fig.2
Fig.3

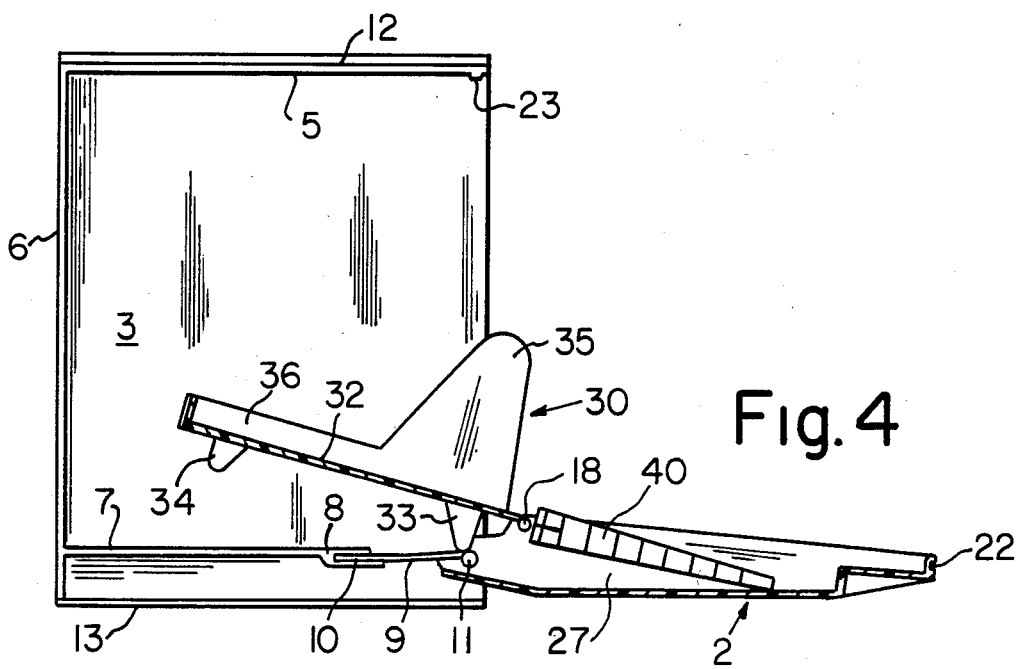
Fig. 4
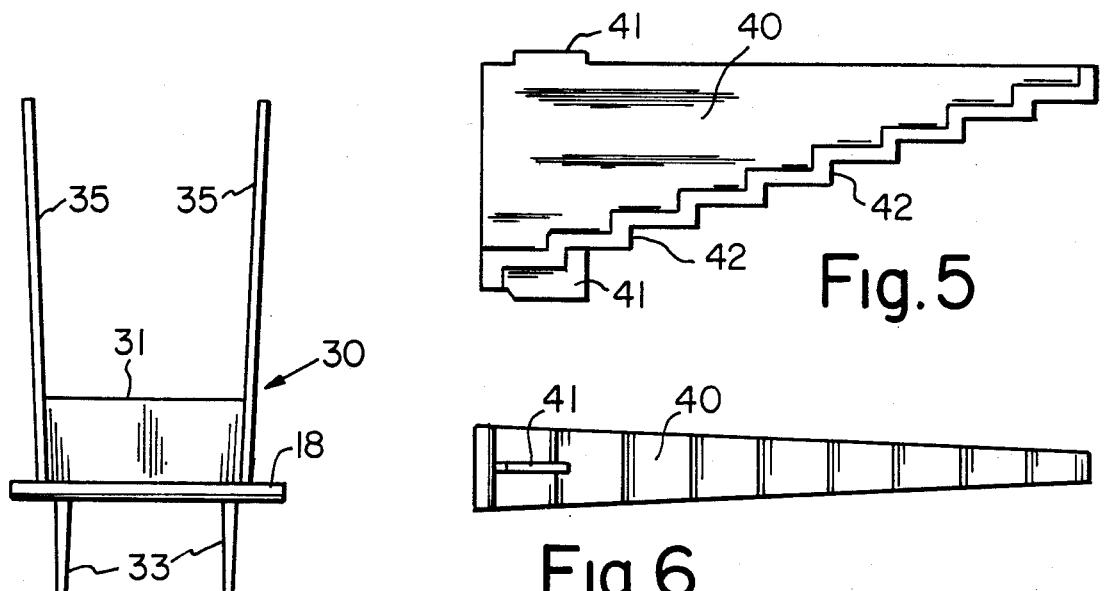
Fig. 5
Fig. 6
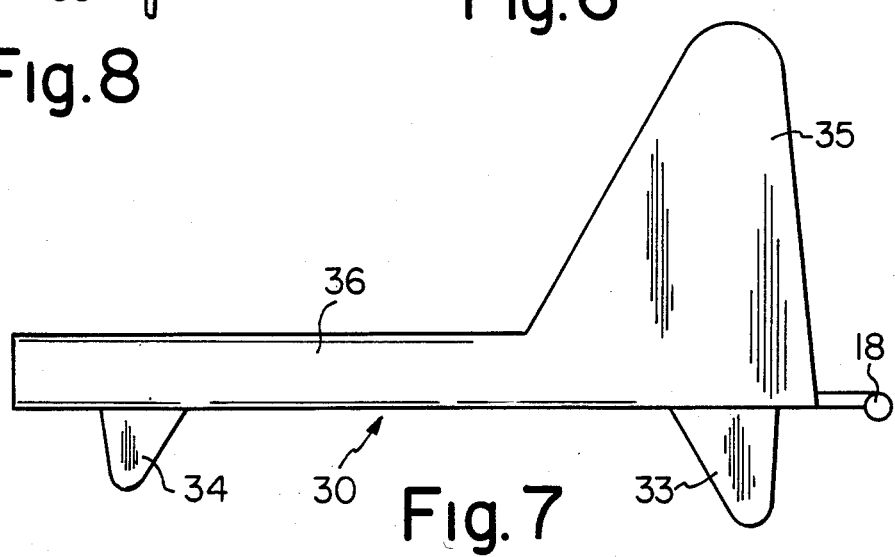
Fig. 8
Fig. 7

STORAGE CONTAINER

BACKGROUND OF THE INVENTION

1. Field of the Invention

The invention relates generally to a container for storing items such as floppy diskettes, compact audio disks, laser disks, phonograph records and the like which should be maintained in a dust-free environment.

Particularly, the invention is a lightweight, inexpensive container which has a door and slide arrangement whereby when the door is opened, the slide upon which the stored items rest is moved out of the container and the items which are stored within the container are deposited on the inner surface of the door in a staggered arrangement. The door is formed with a recessed portion on its inner surface which holds a reversible indexing stop member to stagger the items as they move out of the compartment in order to facilitate selection of the desired item from the group of items. The containers have the capability of storing a large number of items since each container may be connected to one or more identical containers to form a self-contained storage unit.

2. Description of the Prior Art

Storage cases are disclosed in U.S. Pat. Nos. 4,162,112; 4,339,162 and 4,270,817 but none of these patents discloses a container having a compartment closed by a door to protect items stored in the container from dust. This is extremely important because of the type of information which is stored upon diskettes or other items in the container. Additionally, many of the prior art containers utilize a separate mechanical mechanism such as a spring or a resilient member for biasing stored items out of the storage compartment, which adds to the initial expense of the storage case and to the likelihood of breakage due to continuous use. Typical of such arrangements are the storage cases disclosed in U.S. Pat. Nos. 4,162,112; 4,270,817 and 4,275,943. The container disclosed in U.S. Pat. No. 4,519,655 is a modification of the container disclosed and claimed herein without certain unloading features.

SUMMARY OF THE INVENTION

The invention is a container for storing disks and phonograph records and the like which includes a housing having a manually operated door which is pivotally connected to the bottom of the container housing and a movable slide located in the bottom of the housing which supports the items stored within the container and pivotally connected to the door. The pivotal connections are arranged so that when the door is rotated into the open position, the slide is moved partially out of the housing and is tilted toward a recessed portion on the inner surface of the door. The rear end of the slide is formed with an upstanding lip which contacts the rear edges of items which are resting on the upper surface of the slide base and pulls the items partially out of the housing when the door is opened. The recessed portion of the door supports a reversible indexing stop member having a plurality of steps to stagger the individual items as they are discharged from the housing to facilitate visual inspection and selection of the item or items desired by the user. The container is formed with spaced elongated feet on the exterior of the bottom which support the container in the upright position and which may be interlocked with raised channel members on the exterior of the top of another identical container so that the containers may be stacked and interlocked to form a vertical storage unit. Additionally, the exterior of one sidewall of the container is formed with angled channel members which cooperate with angled channel members formed on the exterior of the opposite sidewall of another identical container so that adjacent containers may be interlocked in a row to form a horizontal storage unit. As the disk and/or record library expands, additional containers may be easily and quickly locked into place to enlarge the capacity of the storage unit.

BRIEF DESCRIPTION OF THE DRAWINGS

The present invention is further described with reference to the accompanying drawings wherein like reference numerals refer to like parts throughout and:

FIG. 1 is a perspective view showing a plurality of containers horizontally and vertically interlocked to form a self-contained storage unit;

FIG. 2 is a front view of a container with the door, a part of the bottom wall and the slide removed;

FIG. 3 is a side view of the container with a sidewall removed and the door in the closed position;

FIG. 4 is a side view of the container with a sidewall removed and the door in the open position;

FIG. 5 is a plan view of the reversible indexing stop member;

FIG. 6 is a side view of the reversible indexing stop member shown in FIG. 5;

FIG. 7 is a side view of the slide; and

FIG. 8 is a front view of the slide shown in FIG. 7.

DESCRIPTION OF THE PREFERRED EMBODIMENT

With reference to FIGS. 1-4 of the drawings, the container consists of a housing 1 and a door 2. The housing has a pair of spaced substantially parallel sidewalls 3, a multi-part bottom wall 4, a top wall 5, a rear wall 6 and an open front. The side, top and back walls and a portion of the bottom wall of the housing are integral and may be injection molded from a rigid fireproof thermoplastic polymer such as polystyrene, acrylonitrile-butadienestyrene (ABS) copolymer, polymethyl methacrylate, polycarbonate or polyethylene terephthalate and the like which can be either transparent or opaque.

As shown in FIGS. 3 and 4 of the drawings, the bottom wall 4 of the housing is formed by a rear part 7 which is integral with the rear wall 6 and the sidewalls 3. The rear part 7 has a slotted portion 8 at its forward end. The forward part 9 of bottom wall 4 has a tongue 10 at its rear end which fits into the slot in slotted portion 8 of rear part 7. The forward part 9 is sufficiently flexible so that the front end of the forward part can move vertically relative to housing 1. As seen in FIG. 4 of the drawings, the forward part 9 has a slight upward angle when the door 2 is in the open position for a purpose to be described hereinafter. An inwardly extending elongated foot 13 is located at the lower edge of each sidewall 3. The inwardly extending feet 13 support the container and also function as slides to cooperate with channels 12 molded on the outer surface of the top wall 5 of the housing. This slide and channel arrangement makes it possible to interlock two cases in a vertical stack as shown in FIG. 1 of the drawings.

The exterior surface of one sidewall of the housing is formed with an elongated horizontally extending angled channel member 14 adjacent to its upper edge and an elongated horizontally extending angled channel member 15 adjacent to its lower edge as shown in FIGS. 1 and 2 of the drawings. A pair of complementary angled channel members 16 and 17 are molded on the outer surface of the sidewall opposite the sidewall having members 14 and 15. The angles of members 14 and 16 are complementary as are the angles of members 15 and 17 so that member 14 will interlock with a member 16, and member 15 will interlock with a member 17 to connect two containers in a horizontal row as shown in FIG. 1 of the drawings.

The door 2 is pivotally attached to the front end of the forward part 9 of the bottom wall 4 by pivot pins 11. Each pin extends through a hole in the side web 25 of the door 2. As will be seen in FIGS. 3 and 4 of the drawings, the lower end 20 of the door 2 is located below the pivot pins 11 and contacts the front end of the lower surface of the forward part 9 of the bottom wall 4 to stop rotation of the door when the door is rotated into the open position. The upper end of the door is formed with an inset portion 21 which is adapted to be engaged by the user's finger and with a horizontal stop groove 22. Stop groove 22 fits within the upper forward end of the housing and is close to the inner surface of top wall 5 of the housing. The stop groove frictionally engages a bead 23 located on the inner surface of the top wall 5 when door 2 is in the closed position as shown in FIG. 3 of the drawings. In order to open door 2, a downward force is applied to ledge 24 in inset portion 21 to spring the front end of the forward part 9 of the bottom wall 4 downwardly to release the stop groove 22 from the bead 23. The door may then be rotated into the open position shown in FIG. 4.

As can be seen in FIGS. 3 and 4 of the drawings, a slide 30 is supported above bottom wall 4 by a pair of spaced front legs 33 and a pair of spaced rear legs 34 and is pivotally attached to the lower end of door 2 above the pivot pins 11 by a pair of outwardly extending horizontal pivot lugs 18 which are located at the forward end of the slide. Each lug fits into a horizontal hole formed in one of the spaced side webs 25 which extend along the elongated edges of the door 2. An upstanding lip 31 is located along the rear edge of the base 32 of slide 30. The lip 31 contacts the items stored on the slide so that they move forwardly out of the housing along with the slide when the door 2 is rotated into the open position. The movement of slide 30 is caused by the relative location of the pivot pins 11 and lugs 18 on the door 2. The lower ends of the front legs 33 at the forward end of the slide acts as a pivot point when the door 2 is opened so that as door 2 nears the end of its opening arc, the slide is tilted upwardly which causes the items resting on the slide base 32 to move into the recess 27 in door 2. The slide has spaced upstanding sidewalls along the opposite edges of base 32 to retain items on the base. Each sidewall has a raised forward portion 35 and a lower rear portion 36 extending between forward portion 35 and the upstanding lip 31. While not shown in the drawings, it will be understood by those skilled in the art that the upper surface of slide base 32 may be formed with a plurality of grooves for storing multiple items in spaced relationship.

As will be seen in FIG. 1 of the drawings, a reversible indexing stop member 40 is fitted within the recessed portion 27 on the inner surface of door 2. The indexing stop member has an outwardly extending horizontal tab 41 on each edge and the free end of each tab extends into a slot 43 in a web 25 of the door. The indexing stop member is formed with a plurality of steps 42 along one edge as shown in FIGS. 5 and 6. The indexing stop member 40 is held within the recessed portion 27 of door 2 so that it can be removed from the recessed portion, inverted and replaced in the recessed portion to change the steps from the position shown in FIG. 1 to the opposite hand position (not shown). The position of the indexing stop member in the recessed portion 27 will be determined by the location of the container relative to the user. When the closure member is opened, the base 32 of the slide is tilted upwardly about the bottom of front leg 33 and the items stored on the base move into the recessed portion 27 of door 2 until the forward edges contact the steps 42 on indexing stop member 40 so that the items come to rest in a staggered arrangement. The staggered arrangement makes it easy to select the desired item for subsequent use and exposes the edge of each item so that the items can be easily grasped by the user.

In operation, items are stored on the upper surface of the slide base 32 within the housing 1 of the container and the door 2 is in the closed position shown in FIG. 3 of the drawings. When door 2 is rotated into the open position shown in FIG. 4 of the drawings, the relationship between pivot pins 11 and the pivot lugs 18 permits the door 2 to open and at the same time pull slide 30 and the items resting thereon forward out of the housing of the container so that the front end of the slide is located outwardly of the housing 1. At the same time the slide tilts about the lower end of legs 33 so that the stored items resting on the base 32 of slide 30 move into the recessed portion 27 of door 2 until the forward edge of each item contacts a step 42 on indexing stop member 40. The items come to rest in a staggered arrangement due to the steps 42 on the indexing stop member 40 and can be grasped by the user.

While the housing of the container is shown as rectangular in shape in elevation, it will be understood by those skilled in the art that it can be square or more elongated in either the horizontal or vertical dimension depending upon the size and shape of the items to be stored therein. Also, the width of the storage compartment may be varied according to the thickness of the items being stored.

The storage container of the invention has numerous applications such as the storage of floppy disks in any of the standard, mini or micro sizes, the storage of compact audio disks and laser disks and the like. Also, with appropriate dimensioning, the container may be used to store phonograph records.

While a preferred embodiment of the invention has been described herein, it is to be understood that the invention may be embodied within the scope of the appended claims.

I claim:

1. A storage container having a housing with an open front forming a storage compartment and a door adapted to close the open front of said housing, said housing having a pair of spaced substantially parallel sidewalls, a top wall, a rear wall and a bottom wall extending between said spaced sidewalls and having a rear part attached to said spaced sidewalls and a separate forward part connected to said rear part, a slide located within said housing above said bottom wall of said housing, said slide having a base adapted to support items with said housing, said door being pivotally connected to the front end of said forward part of said bottom wall, means pivotally connecting the forward end of said slide and said door, said means pivotally connecting said slide and said door being located above the pivotal connection between said door and said front end of said forward part of said bottom wall of said housing when said door is in the closed position, and downwardly extending means on the front end of the bottom surface of said base of said slide to space said slide above said bottom wall of said housing and to form a pivot contact between said slide and said bottom wall, whereby when said door is rotated into the open position, said slide is moved forwardly by the means pivotally connecting the forward end of said slide and said door and said base of said slide is tilted about the pivot contact between said downwardly extending means on the bottom surface of said base of said slide and said bottom wall to cause items resting on said base of said slide to move at least partially out of said storage compartment onto said door.

2. A storage container as set forth in claim 1 wherein said door has a bottom end portion located below said pivotal connection between said door and said bottom wall of said housing, whereby said bottom end portion of said door contacts the lower surface of said bottom wall of said housing when said door is rotated into the open position to stop rotation of said door.

3. A storage container as set forth in claim 1 including an inwardly extending elongated foot at the lower edge of each of said spaced sidewalls of said housing and means on the outer surface of said top wall of said housing forming elongated grooves on said top wall, whereby said inwardly extending feet are adapted to fit within said grooves on an adjacent container to interlock adjacent containers in a vertically stacked unit.

4. A storage container as set forth in claim 1 including spaced substantially parallel elongated angled channel members on the outer surface of one of spaced sidewalls of said housing and complementary spaced substantially parallel elongated angled channel members on the outer surface of the other of said spaced sidewalls of said housing, whereby each of said elongated angled channel members is adapted to interlock with an elongated angled channel member on an adjacent container to interlock adjacent containers in a horizontal row as a unit.

5. A storage container as set forth in claim 1 wherein said rear part of said bottom wall has a slotted portion at the forward end and said forward part of said bottom wall has a tongue portion at its rear end fitted into said slotted portion of said rear part to connect said rear part of said bottom wall with said forward part of said bottom wall, whereby the front end of said forward part of said bottom wall may be moved vertically relative to said rear part of said bottom wall when a downward force is applied to the pivotal connection between the front end of said forward part of said bottom wall and said door.

6. A storage container as set forth in claim 5 including stop means located at the upper end of said door in contact with the inner surface of said top wall of said housing to hold said door in the closed position until said door is depressed to lower the front end of said forward part of said bottom wall to release said stop means from the inner surface of said top wall.

7. A storage container as set forth in claim 1 including an indexing stop member located in said door, said indexing stop member having a plurality of steps along one edge, whereby items moved onto said door from said base of said slide are arranged in a staggered relationship when they contact the steps on said indexing stop member.

8. A storage container as set forth in claim 7 wherein said indexing stop member has lateral tabs extending outwardly from each edge in engagement with said door to hold said indexing stop member on said door, whereby said indexing stop member may be reversed on said door to accommodate both left-handed and right-handed users of said storage container.

9. A storage container as set forth in claim 1 wherein said slide includes raised side members along each side edge of said base to retain stored items on said base.

10. A storage container as set forth in claim 1 wherein said slide includes spaced rear support legs on the bottom surface of said base to support said slide above said bottom wall of said housing.

11. A storage container having a housing with an open front forming a storage compartment and a door adapted to close the open front of said housing, said housing having a pair of spaced substantially parallel sidewalls, a top wall, a rear wall and a bottom wall extending between said spaced sidewalls and having a rear part attached to said spaced sidewalls, a slide located within said housing, front and rear legs on the bottom of said slide spacing said slide above said bottom wall of said housing, said slide having a base adpated to support items stored within said housing, said door being pivotally connected to the forward end of said bottom wall, a means pivotally connecting the forward end of said slide and said door, said means pivotally connecting said slide and said door being located above the pivotal connection between said door and said bottom wall of said housing when said door is in the closed position, whereby when said door is rotated into the open position, said slide is moved forwardly by the means pivotally connecting the forward end of said slide and said door and said base of said slide is tilted about the bottom of said front legs to raise the rear end of said slide to cause items resting on said base of said slide to move at least partially out of said storage compartment onto said door.

12. A storage container as set forth in claim 11 wherein said door has a bottom end portion located below said pivotal connection between said door and said bottom wall of said housing, whereby said bottom end portion of said door contacts the lower surface of said bottom wall of said housing when said door is rotated into the open position to stop rotation of said door.

13. A storage container as set forth in claim 11 including an inwardly extending elongated foot at the lower edge of each of said spaced sidewalls of said housing and means on the outer surface of said top wall of said housing forming elongated grooves on said top wall, whereby said inwardly extending feet are adapted to fit within said grooves on an adjacent container to interlock adjacent containers in a vertically stacked unit.

14. A storage container as set forth in claim 13 including spaced substantially parallel elongated angled channel members on the outer surface of one of said spaced sidewalls of said housing and complementary spaced substantially parallel elongated angled channel members on the outer surface of the other of said spaced sidewalls of said housing, whereby each of said elongated angled channel members is adapted to interlock with an elongated angled channel member on an adjacent container to interlock adjacent containers in a horizontal row as a unit.

15. A storage container as set forth in claim 11 wherein said bottom wall of said housing has a rear part and a forward part, said rear part attached to said spaced sidewalls and to said rear wall of said housing and having a slotted portion at the forward end, said forward part having a tongue portion at its rear end fitted into said slotted portion of said rear part to connect said rear part of said bottom wall with said forward part of said bottom wall and said door being pivotally attached to the front end of said forward part of said bottom wall, whereby the front end of said forward part of said bottom wall may be moved vertically relative to said rear part of said bottom wall when a downward force is applied to the pivotal connection between the front end of said forward part of said bottom wall and said door.

16. A storage container as set forth in claim 15 including a stop means on the upper end of said door in contact with the inner surface of said top wall of said housing to hold said door in the closed position until said door is slightly depressed vertically to move the front end of said forward part of said bottom wall to release said stop means from the inner surface of said top wall.

17. A storage container as set forth in claim 11 including a recessed portion on the inner surface of said door and an indexing stop member located in said recessed portion of said door, said indexing stop member having a plurality of steps along one edge, whereby items moving from said base of said slide onto said door contact the steps on said indexing stop member and are arranged in a staggered relationship in said recessed portion of said door.

18. A storage container as set forth in claim 17 wherein said indexing stop member has a laterally extending tab on each edge and said tabs engage said door to hold said indexing stop member in said door, whereby said indexing stop member may be reversed in said recessed portion of said door to accommodate both left-handed and right-handed users of said storage case.

19. A storage container as set forth in claim 1 wherein said slide includes raised side members along each side edge of said base to retain items on said base.

20. A storage container as set forth in claim 11 wherein said means spacing said slide above said bottom wall of said housing is a plurality of support legs on the bottom surface of said base.

* * * * *